(12) United States Patent
Escobedo

(10) Patent No.: US 10,470,376 B1
(45) Date of Patent: Nov. 12, 2019

(54) PLANT POTS WITH A DRAINING SYSTEM AND RELATED METHODS

(71) Applicant: Frank Escobedo, Miami, FL (US)

(72) Inventor: Frank Escobedo, Miami, FL (US)

( * ) Notice: Subject to any disclaimer, the term of this patent is extended or adjusted under 35 U.S.C. 154(b) by 0 days.

(21) Appl. No.: 16/127,404

(22) Filed: Sep. 11, 2018

Related U.S. Application Data

(63) Continuation-in-part of application No. 15/403,605, filed on Jan. 11, 2017, now Pat. No. 10,098,288, which is a continuation-in-part of application No. 15/257,144, filed on Sep. 6, 2016, now Pat. No. 10,111,393, which is a continuation-in-part of application No. 15/182,976, filed on Jun. 15, 2016.

(51) Int. Cl.
*A01G 27/00* (2006.01)
*A01G 9/02* (2018.01)

(52) U.S. Cl.
CPC .............. *A01G 9/02* (2013.01); *A01G 27/001* (2013.01)

(58) Field of Classification Search
CPC .......... A01G 9/124; A01G 9/122; A01G 9/12; A01G 27/00; A01G 9/033; A01G 9/02; A47G 7/00; A47G 7/04; A47G 7/041
See application file for complete search history.

(56) References Cited

U.S. PATENT DOCUMENTS

| | | | |
|---|---|---|---|
| 4,151,680 A | 5/1979 | Sena | |
| 4,841,670 A | 6/1989 | Bitter | |
| 6,237,285 B1 * | 5/2001 | Yoshida | A01G 9/033 47/65.9 |
| 6,446,388 B2 | 9/2002 | Masello | |
| 6,694,672 B1 * | 2/2004 | Hergeth | E01C 13/083 47/65.9 |
| 7,392,616 B1 * | 7/2008 | Bagby | A01G 9/027 47/65.9 |
| 7,637,055 B2 * | 12/2009 | Donaldson | A01G 9/02 47/45 |
| 7,726,071 B2 * | 6/2010 | Carpenter | E04D 11/002 47/65.9 |
| 7,966,768 B2 * | 6/2011 | DiPaolo | A01G 9/124 47/39 |
| 8,166,704 B1 | 5/2012 | Sydlowski | |
| 8,186,101 B2 * | 5/2012 | Kurtz | A01G 9/12 47/45 |
| 8,857,103 B1 | 10/2014 | Coon | |
| 9,060,469 B2 * | 6/2015 | Kamon, II | A01G 9/124 |
| 9,572,307 B2 * | 2/2017 | Mermelstein | A01G 9/12 |
| 9,943,041 B2 * | 4/2018 | Harger | A01G 9/124 |
| 2002/0007593 A1 * | 1/2002 | Mischo | A01G 9/033 47/86 |
| 2008/0236041 A1 * | 10/2008 | Carpenter | E04D 11/002 47/65.9 |
| 2009/0056217 A1 | 3/2009 | DiPaolo | |
| 2009/0133326 A1 | 5/2009 | Donaldson | |

(Continued)

*Primary Examiner* — Kristen C Hayes
(74) *Attorney, Agent, or Firm* — Allen Dyer Doppelt & Gilchrist

(57) ABSTRACT

A plant pot assembly includes a plant pot defining an inner volume, having an upper pot edge and including a mounting flange. A plurality of ridges featuring a plurality of drainage holes are formed above the bottom surface of the plant pot. A drainage passageway and an opening is formed below the bottom surface of the plant pot for further draining excessive water in the plant pot.

19 Claims, 5 Drawing Sheets

(56) References Cited

U.S. PATENT DOCUMENTS

2011/0289839 A1* 12/2011 Cronk .................... A01G 9/025
  47/65.7
2015/0047258 A1   2/2015  Lewis
2015/0101248 A1   4/2015  Adkinson
2017/0127621 A1   5/2017  Harger

* cited by examiner

US 10,470,376 B1

PLANT POTS WITH A DRAINING SYSTEM AND RELATED METHODS

CROSS-REFERENCE TO RELATED APPLICATION

This application is a continuation-in-part of U.S. patent application Ser. No. 15/403,605, filed on Jan. 11, 2017, now U.S. Pat. No. 10,098,288, which is a continuation-in-part of U.S. patent application Ser. No. 15/257,144 filed on Sep. 6, 2016, now U.S. Pat. No. 10,111,393, which is a continuation-in-part of U.S. application Ser. No. 15/182,976 filed on Jun. 15, 2016, the contents of which applications are herein incorporated by reference in their entirety.

FIELD OF THE INVENTION

The present invention relates to plant pots, more particularly to pots having a drainage system and a feeding system.

BACKGROUND OF THE INVENTION

Problems associated with growing plants in conventional flower pots, e.g. vegetables, have included a lack of drainage and air circulation below the pot. Poor drainage can promote the accumulation of excess water and prevent roots of the plant from absorbing nutrients. Various plant pots have been developed for optimal plant growing, but further improvements are possible.

SUMMARY OF THE INVENTION

In view of the foregoing, an object of the present invention is to provide an improved plant pot with a drainage system, and related features and methods. According to one embodiment of the invention, the plant pot assembly includes a plant pot defining an inner volume, having an upper pot edge and including a mounting flange. A plurality of ridges featuring a plurality of drainage holes are formed above the bottom surface of the plant pot. A drainage passageway and an opening is formed below the bottom surface of the plant pot for further draining excessive water in the plant pot.

These and other objects, aspects and advantages of the present invention will be better appreciated in view of the drawings and following detailed description of preferred embodiments.

DETAILED DESCRIPTION OF A PREFERRED EMBODIMENT

Figure 1:
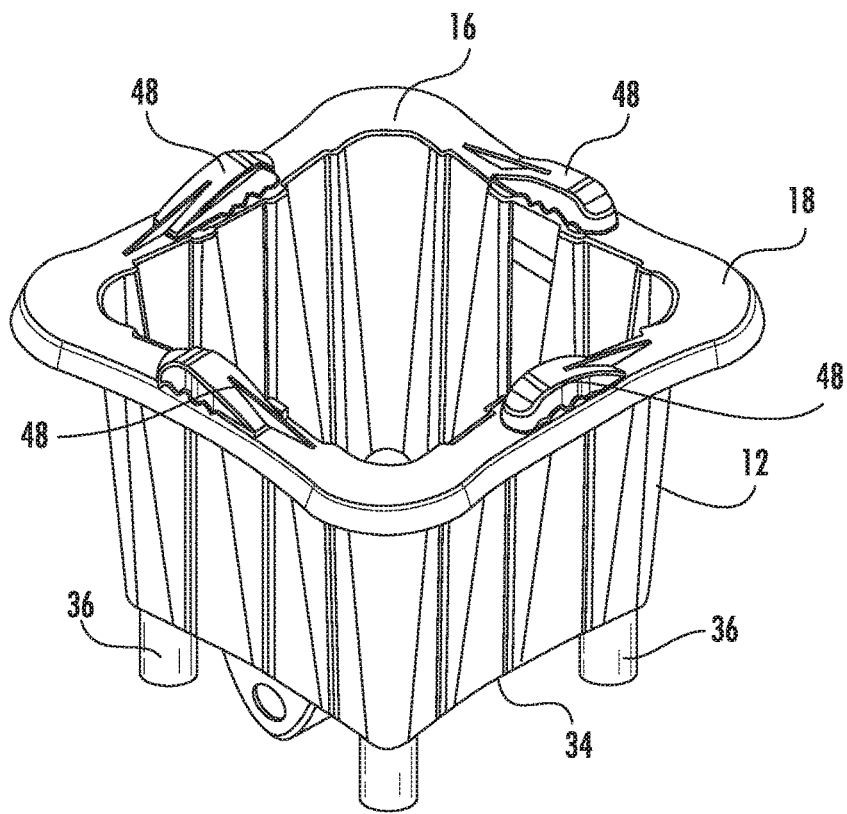
FIG. 1 is a perspective view of a plant pot assembly according to an embodiment of the present invention.
Figure 2:
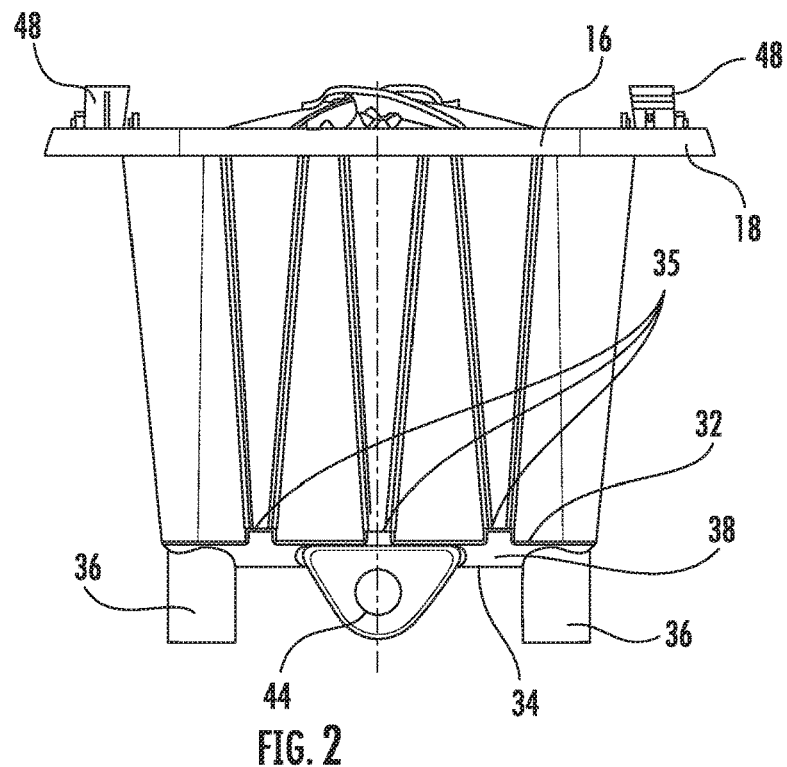
FIG. 2 is a side view of a plant pot assembly of FIG. 1.
Figure 3:
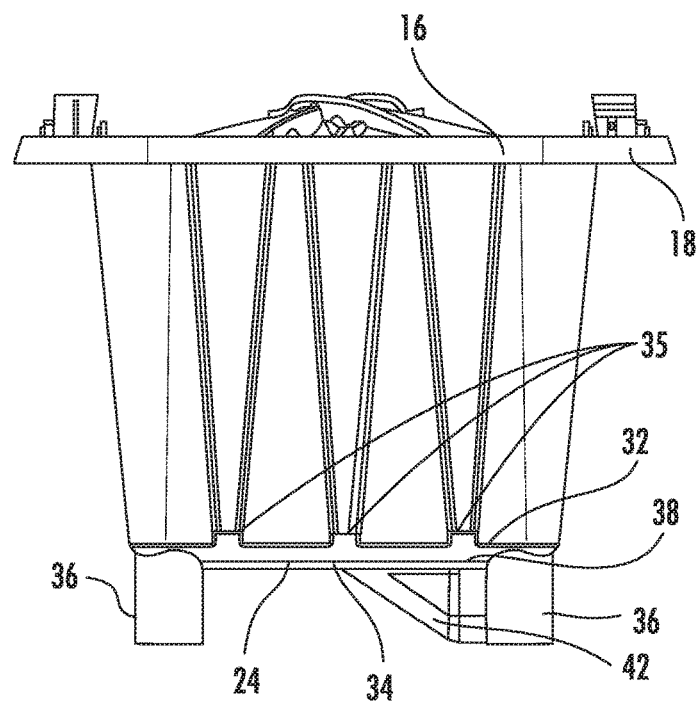
FIG. 3 is another side view of a plant pot assembly of FIG. 1.
Figure 4:
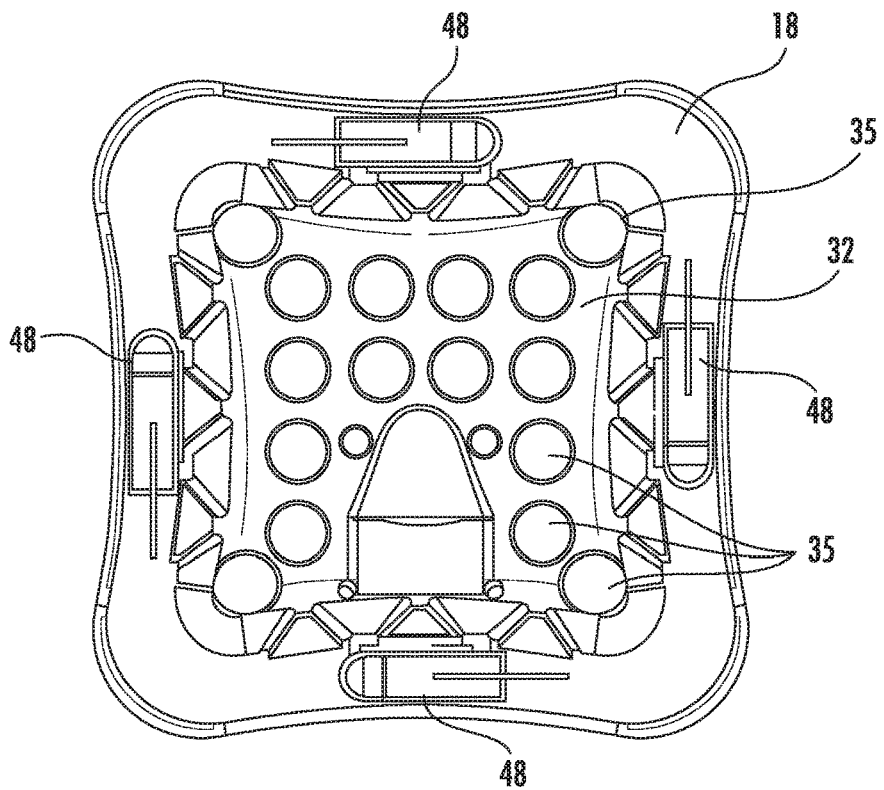
FIG. 4 is a top view of the plant pot assembly of FIG. 1.
Figure 5:
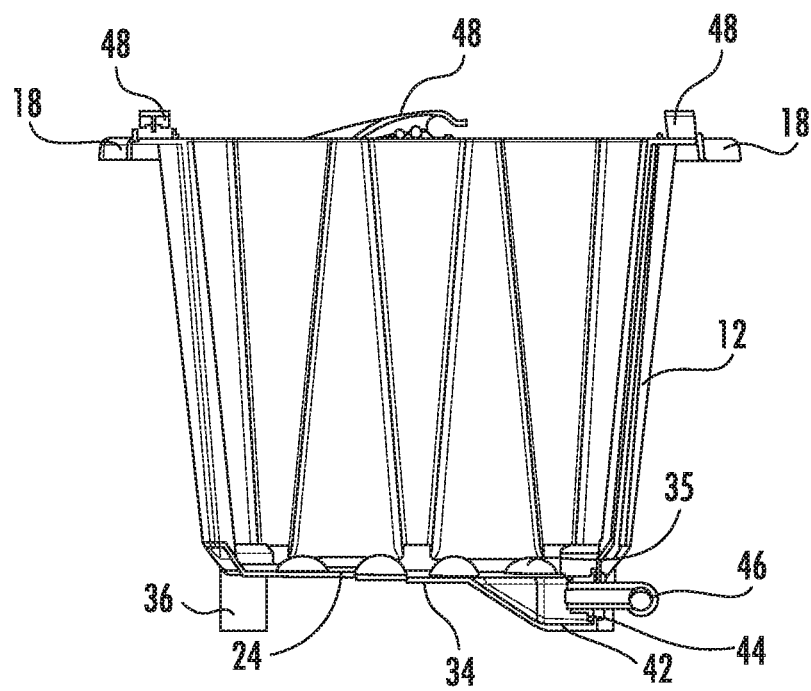
FIG. 5 is a cross sectional view of the plant plot assembly of FIG. 1.
Figure 6:
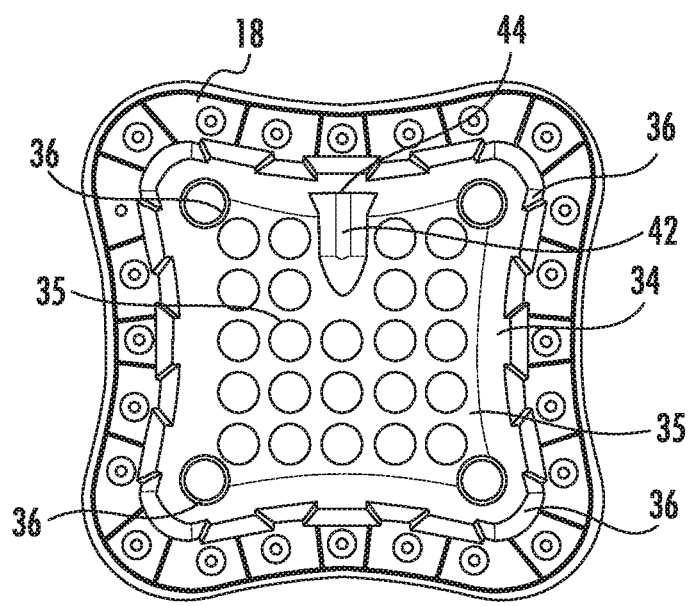
FIG. 6 is a bottom view of a plant pot assembly of FIG. 1.
Figure 7:
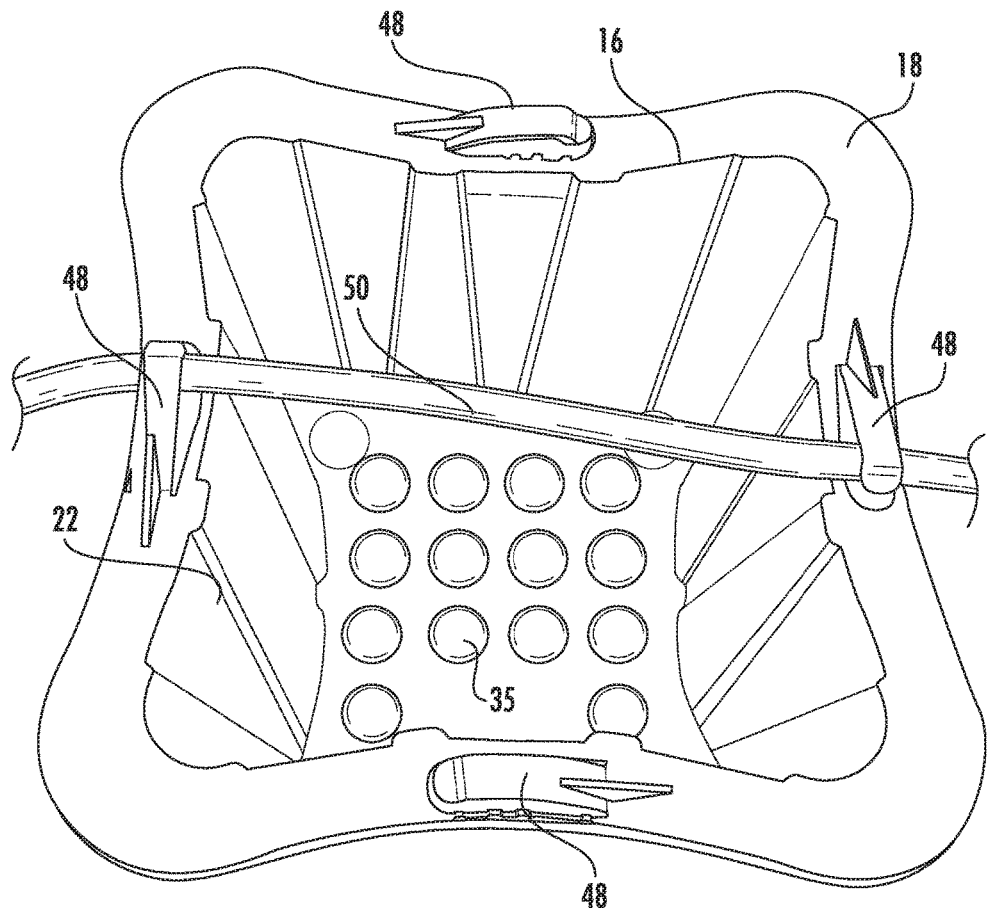
FIG. 7 is top view of the plant pot assembly of FIG. 1 further including a feeding arm.

According to an embodiment of the present invention, and referring to FIGS. 1-7, a plant pot assembly 10 includes a pot 12, an interior volume 14 of which has an upper pot edge 16 that includes a mounting flange 18. The pot 12 can be different shapes. In the depicted embodiment, the pot 12 has a tapered square shape with radius corners between sidewalls 22. The radius corners function to reduce internal stress. The pot 12 has a square cross section with trapezoidal sidewalls 22. The upper edge 16 has a larger perimeter than the lower edge 24. The upper edge 16 can also have one or more concave curves to reduce the concentration of stress while providing sufficient space for the mounting flange 18. The pot 12 can also have a polygonal cross section or some other desired shape of cross section. In the depicted embodiment, the sidewalls 22 are sloped approximately 5 degrees outboard from bottom to top so that the surface area of the pot 12 is maximized at the top, enabling multiple pots 12 to be stacked for storage or shipment. The pot 12 can adopt any desired dimension as needed, it can be covered with embossed and printed patterns, and it can be made out of clay, ceramic, plastic, or any other suitable materials.

A plurality of aerating ridges 35 and drainage holes can be formed as desired on the bottom surface 34 to offset a certain length from the bottom surface 34. A plurality of hollow insertable legs 36 can be inserted at the four corners of the bottom surface 34 of a square shape pot 12. The legs 36 can be circular or any other shape chosen to elevate the pot of the ground in order to create better drainage, keeping the roots of a plant away from cold surfaces, infiltration of water or any other liquids and insects. The plurality of legs 36 can also include drainage cavities. The number of legs can be determined by the size, shape and/or weight of the pot 12. When multiple 12 are stacked, the upper edge 16 and the legs 36 of adjoining plant pot will stack in a regular array and hold the plant pot firmly in place. The legs 36 are molded firmly into the pot. The legs 36 can be attached or detached from the bottom surface 34 of the pot 12 and be positioned under the bottom surface 34 when needed in order to elevate the pot of the ground for better drainage.

A drainage chamber 38 can thus be created between the drainage plate 32 and the bottom surface 34. In another embodiment, one or more ridges 35 rises up from the bottom surface 34. The one or more ridges 35 also features a plurality of drainage holes, which being held at a certain altitude above the bottom surface 34 create a drainage chamber 38 therebetween. The ridges 35 can be different shapes, dimensions and/or formed at different locations of bottom surface 34. In the depicted embodiment, the ridges 35 are shown to be elevated about 7/8" above the bucket bottom surface 34. Other dimensions can be used. The ridges 35 can be of different sizes and shapes as needed to correspond to the shape and size of the pot 12. Alternatively, the plant pot assembly 10 can also include an optional drainage plate 32 adapted to be positioned above the top of bottom surface 34. The optional drainage plate 32 can include one or more ridges 35 rising up from the flat portion of the plate 32.

Referring to FIGS. 1-5 and 7, the plant pot assembly 10 further includes a plurality of clips 48 on mounting flange 18. The plurality of clips 48 are configured for securing a feeding arm/hoses 50 fitted over the upper edge of the plant pot 12. Different numbers, shapes and dimensions of clips 48 and feeding arm 50 can be used. In the depicted embodiment, the feeding arm 50 is a one-branch water-and-nutrient emitter. The feeding arm 50 can, however, include multiple branches and be any other shape as needed. The feeding arm 50 includes a plurality of spray nozzles (not shown), and it is connected to a supply hose (not shown). In the depicted embodiment, the clips 48 includes three clip openings, and each opening is configured to secure a feeding arm of ⅛, ¼, ⅜ and ½ inches in diameter.

A sloped drainage passageway 42 is formed below the bottom surface 34. The passageway 42 slopes downwardly slightly from the bottom surface 34 to an opening 44 at a lowermost elevation end of the passageway 42 such that water drained from the bottom surface of the plant pot 12 can flow by gravity to the passageway 42 and flow toward the opening 44 located at the lowermost elevation end of the sloped passageway 42. The opening 44, being at the lowermost level, can insure adequate drainage of all parts of the plant pot and thereby prevent any accumulation of water and inhibit the aeration of all parts of the growing media. The downward-sloping passageway 42 leads toward the opening 44, ensuring that water not draining through the bottom surface 34 will drain through the opening 44. The opening 44 can prevent root rot or over saturation which can cause a multiple of disease, pathogens and bacteria.

Figure 8:
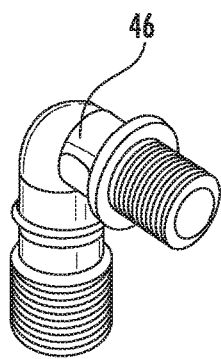
FIG. 8 is a perspective view of a drainage insert according to yet another embodiment of the present invention.
Figure 9:
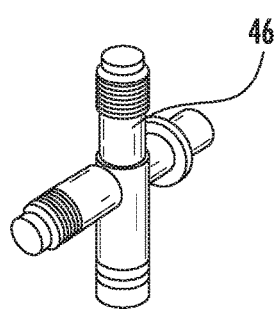
FIG. 9 is perspective view of another drainage insert according to another embodiment of the present invention.
Figure 10:
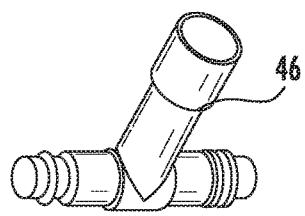
FIG. 10 is a perspective view of another drainage insert, according to another embodiment of the present invention.

Referring to FIGS. 8-10, a drainage insert 46 is configured to be inserted into the opening 44, the drain opening in the bottom of the pot. The drainage insert 46 extends horizontally outwardly from the opening 44 beyond the side wall 22. The drainage insert 46 can be removably or permanently attached to the opening 44. The drainage insert 46 can be of different shapes (e.g., L-shaped, T-shaped, etc.) and dimensions, depending on the desired purpose and dimension of the opening 44. The drainage insert 46 can be attached to one or more drainage pipes or hoses (not shown), further extending the draining passageway. The drainage insert 46 can also include one or more washers (e.g., silicon washers) between the threaded fittings of the drainage insert 46. The one or more washers can overlap the outside diameter of the opening 44 for a water tight seal, which prevents water leakage and lowers humidity by expelling the liquids via the drainage insert 46 and hoses connected thereon. The drainage insert 64 can be made of any appropriate material, such as plastic, metal, ceramic and the like.

Figure 11:
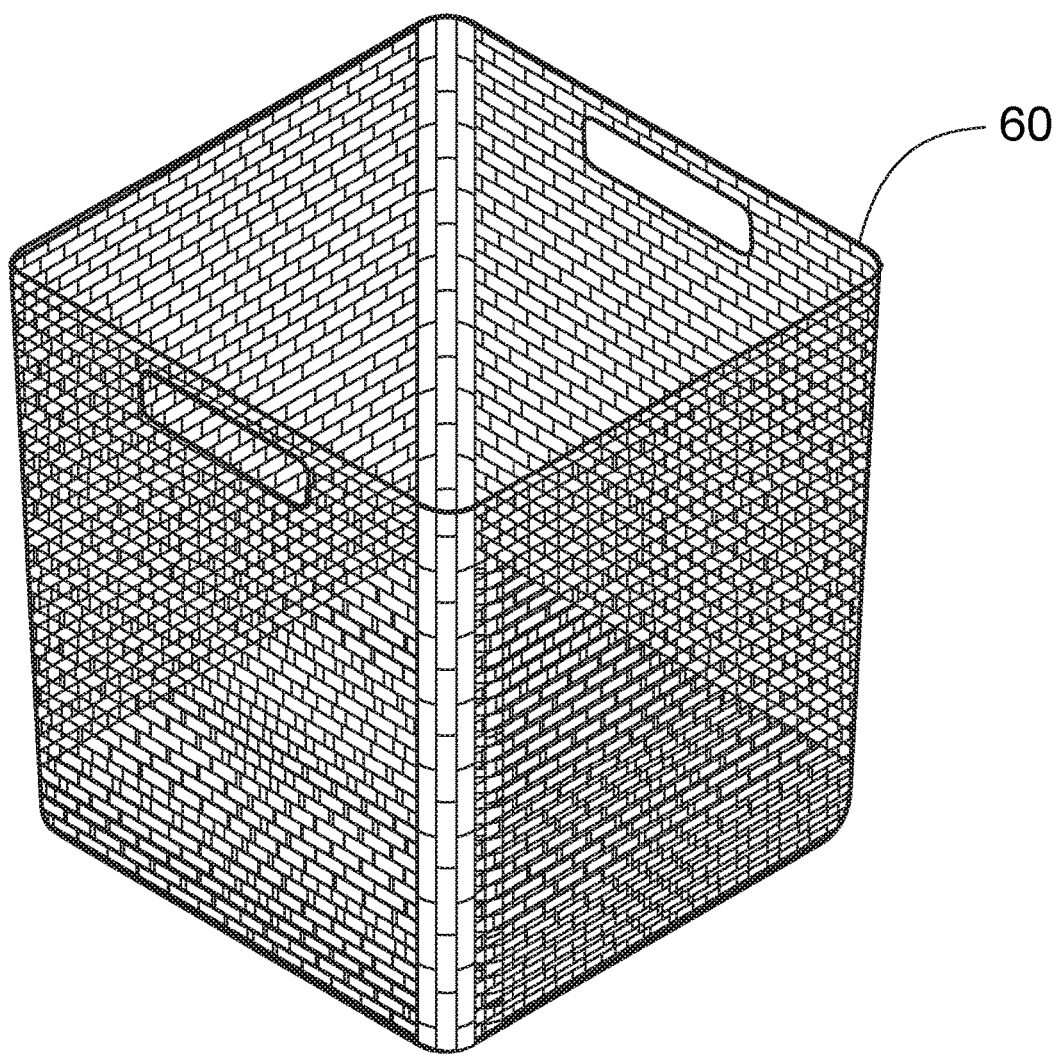
FIG. 11 is a perspective view of a screen mesh according to another embodiment of the present invention.

In one embodiment, a layer of mesh screen 60 shown in FIG. 11 can be laid up against the inner sidewall 22 and top of the molded ridges 35 of the pot 12. The layer of mesh screen 60 can increase air flow inside the pot 12 and provide vital oxygen to the roots that maintain a healthy plant. The layer of mesh screen 60 can be made of fiberglass, metal (e.g., aluminum screen, bronze) coated with vinyl or other non-corrosion materials, or materials such as Kevlar®, PBO, carbon or ultra-high molecular weight polyetheylene (UHMWPE). The layer of mesh screen 60 can be treated with an antibacterial or mold-resistant solution. Different mesh sizes can be used for drainage or aeration.

The mesh screen 60 can help expel the liquids quickly but also to help airflow and bring oxygen to the root zone, helping evaporate any access water in the medium. The mesh screen 60 enables aggressive feeding of the plant with minimal risk of soil contamination, root rot or any other water related diseases. When a plant is transited from one pot to another or a new location, the mesh screen 50 can be moved along with the plant, allowing faster and less problematic or shock in the transition, elimination of sick plant and easy clean-up. In another scenario, when a plant is transferred to a pot 12, a new mesh screen 60 can be used to prevent cross contamination or soil exhaustion from a previous plant.

From the foregoing, it will be appreciated that a plant plot assembly according to the present invention supports plants in a pot with easily assembled parts so that the plants are held firmly in position in the pots. The assembly is readily adaptable to a wide range of plant sizes from a variety of purposes. The present invention also provides for a full circulation of air, water and nutrients in the pots so that the root system of the plants will have an optimum growth environment.

In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and of the claims appended hereto.

What is claimed is:
1. A plant pot assembly comprising:
   a plant pot defining an interior volume having an upper pot edge including a mounting flange;
   a plurality of ridges having a plurality of drainage holes are formed above a bottom surface of the plant pot;
   a drainage passageway and a drainage opening formed below the bottom surface of the plant pot for further draining excessive water in the plant pot;
   a screen mesh configured to be inserted against inner sidewalls of the plant pot and above the plurality of ridges.
2. The plant pot assembly of claim 1, wherein the passageway is integrally formed below the bottom surface of the plant pot.
3. The plot assembly of claim 1, wherein the plant pot has a generally rectangular cross section with radius corners.
4. A plant pot assembly comprising:
   a plant pot defining an interior volume having an upper pot edge including a mounting flange;
   a plurality of ridges having a plurality of drainage holes are formed above a bottom surface of the plant pot; and
   a drainage passageway and a drainage opening formed below the bottom surface of the plant pot for further draining excessive water in the plant pot;
   wherein a plurality of legs are attached to the bottom surface of the plant pot to offset a certain length from the bottom surface.
5. The plant pot assembly of claim 4, wherein the plurality of legs are releasably attached to the bottom surface of the plant pot.
6. A plant pot assembly comprising:
   a plant pot defining an interior volume having an upper pot edge including a mounting flange;
   a plurality of ridges having a plurality of drainage holes are formed above a bottom surface of the plant pot;
   a drainage passageway and a drainage opening formed below the bottom surface of the plant pot for further draining excessive water in the plant pot; and
   a feeding arm configured to fit over the upper pot edge of the plant pot.
7. The plant pot assembly of claim 6, wherein the feeding arm includes a plurality of spraying nozzles.

8. The plant pot assembly of claim 6, wherein the feeding arm is attached to the mounting flange via a plurality of clips mounted on the mounting flange.

9. The plant pot assembly of claim 8, wherein each of the plurality of clips includes a plurality of clip openings, and each clip opening is dimensioned to fit a specific cross section of the feeding arm.

10. The plant pot assembly of claim 6, wherein the feeding arm includes one feeding branch.

11. The plant pot assembly of claim 6, wherein the feeding arm includes multiple feeding branches.

12. A plant pot assembly comprising:
   a plant pot defining an interior volume having an upper pot edge including a mounting flange;
   a plurality of ridges having a plurality of drainage holes are formed above a bottom surface of the plant pot; and
   a drainage passageway and a drainage opening formed below the bottom surface of the plant pot for further draining excessive water in the plant pot;
   wherein the drainage opening further includes a drainage insert configured to be attached to one or more draining hoses.

13. The plant pot assembly of claim 12, wherein the drainage insert is a cross-shaped bracket.

14. The plant pot assembly of claim 12, wherein the drainage insert is an L-shaped bracket.

15. The pant pot assembly of claim 12, wherein the drainage insert is a T-shaped bracket.

16. A plant pot assembly comprising:
   a plant pot having a bottom surface and sidewalls defining an interior volume having an upper pot edge including a mounting flange;
   a plurality of ridges having a plurality of drainage holes formed above the bottom surface of the plant pot;
   at least one drainage opening formed below a bottom of one of the sidewalls of the plant pot;
   a screen mesh inserted against inner surfaces of the sidewalls of the plant pot and above the plurality of ridges; and
   at least one feeding arm configured to fit over the mounting flange of the plant pot.

17. The plant pot assembly of claim 16, wherein the feeding arm is attached to the mounting flange via a plurality of clips on the mounting flange.

18. The plant pot assembly of claim 17, wherein each of the plurality of clips include a plurality of clip openings, and each clip opening is dimensioned to fit a specific cross section of the feeding arm.

19. The plant pot assembly of claim 16, further comprising a drainage insert fitted on the drainage opening, and the drainage insert is configured to be connected to one or more draining hoses.

* * * * *